United States Patent [19]

Inabayashi et al.

[11] Patent Number: 5,234,759
[45] Date of Patent: Aug. 10, 1993

[54] BRAZING SHEET COMPRISING AN AL—MG—SI ALLOY BRAZING MATERIAL

[75] Inventors: Yoshihito Inabayashi; Takeyoshi Doko; Kazunori Ishikawa, all of Tokyo, Japan

[73] Assignee: Furukawa Aluminum Co., Ltd., Tokyo, Japan

[21] Appl. No.: 775,964

[22] PCT Filed: Mar. 11, 1991

[86] PCT No.: PCT/JP91/00327
§ 371 Date: Oct. 31, 1991
§ 102(e) Date: Oct. 31, 1991

[87] PCT Pub. No.: WO91/13719
PCT Pub. Date: Sep. 19, 1991

[30] Foreign Application Priority Data

Mar. 9, 1990 [JP] Japan .................... 2-59322

[51] Int. Cl.$^5$ .................... B23K 35/22; B23K 35/28
[52] U.S. Cl. .................... 428/330; 148/415; 148/440; 420/546; 428/331; 428/551; 428/559; 428/564; 428/565; 428/654
[58] Field of Search .............. 428/654, 330, 331, 551, 428/559, 564, 565; 420/546; 148/415, 440

[56] References Cited

U.S. PATENT DOCUMENTS

| | | | |
|---|---|---|---|
| 4,093,782 | 6/1978 | Anthony et al. | 428/654 |
| 4,098,957 | 7/1978 | Vernam et al. | 428/654 |
| 4,161,553 | 7/1979 | Vernam et al. | 428/654 |
| 4,560,625 | 12/1985 | Kaifu et al. | 428/654 |
| 4,788,037 | 11/1988 | Kaifu et al. | 420/534 |

FOREIGN PATENT DOCUMENTS

| | | |
|---|---|---|
| 2543899 | 4/1976 | Fed. Rep. of Germany . |
| 56-22440 | 5/1981 | Japan . |
| 59-129749 | 7/1984 | Japan . |
| 1-157766 | 6/1989 | Japan . |
| 1-218795 | 8/1989 | Japan . |
| 1-234541 | 9/1989 | Japan . |

*Primary Examiner*—Paul J. Thibodeau
*Assistant Examiner*—D. S. Nakarani
*Attorney, Agent, or Firm*—Birch, Stewart, Kolasch & Birch

[57] ABSTRACT

A brazing sheet having an Al alloy core material one or each of whose surfaces is clad with a brazing material, the brazing sheet being excellent in vacuum brazing ability suitable for the manufacture of aluminum heat exchangers that have a hollow structure. The brazing material is an Al—Mg—Si alloy brazing material comprising 0.6 to 1.8 wt % of Mg, 6.0 to 20.0 wt % of Si, and the balance of Al and inevitable impurities, and having, in its metal texture, 1,000/mm$^2$ or more Mg$_2$Si particles 2 to 5 μm in diameter, with the particles being assumed to be spheres, and 3,000/mm$^2$ or more Si particles 6 μm or less in diameter, with the particles being assumed to be spheres.

6 Claims, 1 Drawing Sheet

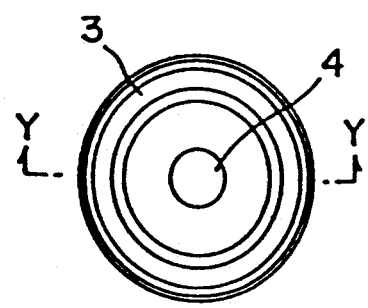
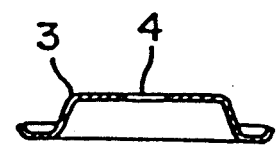
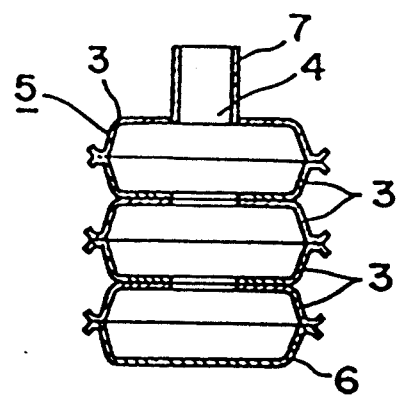
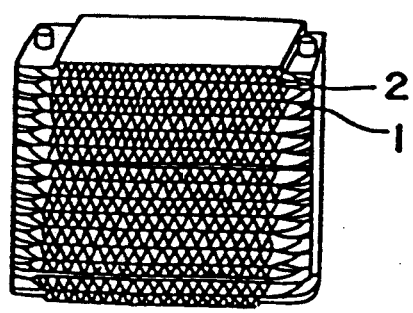

BRAZING SHEET COMPRISING AN AL—MG—SI ALLOY BRAZING MATERIAL

TECHNICAL FIELD

The present invention relates to a brazing sheet that is suitable for the manufacture of aluminum heat exchangers that have a hollow structure, that has an Al—Mg—Si alloy brazing material which is excellent in vacuum brazing ability on one or both of the surfaces of an Al alloy core material.

BACKGROUND ART

In recent years, a vacuum brazing technique wherein no flux is required in brazing aluminum structures has been developed and is widely used because there is no fear of pollution. In the vacuum brazing technique a brazing sheet comprised of an aluminum alloy core material having one or both surfaces thereof clad with an aluminum alloy brazing material skin is used, and the brazing is carried out in a vacuum. Vacuum brazing is used in brazing various structures, including heat exchangers. For vacuum brazing sheets, various aluminum alloy core materials and various aluminum alloy brazing skin materials have been developed and are standardized at present by JIS (Japan Industrial Standard) Z3263.

For a vacuum brazing sheet used in heat exchangers, generally JIS A3003, JIS A3005, JIS A3105, or JIS A6951 alloy is used as a core material, and JIS BA4004 or JIS AA4104 alloy brazing material having the composition shown in Table 1 is used as a skin material. Brazing sheets that have a thickness of 0.5 to 1.2 mm, one or both of whose surfaces are clad with a brazing material, with the cladding ratio being 5 to 15% on each surface, are used.

TABLE 1

| Alloy Name | Si | Fe | Cu | Mn | Mg | Zn | Bi | Al |
|---|---|---|---|---|---|---|---|---|
| 4004 | 9.0–10.5 | 0.8 or below | 0.25 or below | 0.10 or below | 1.0–2.0 | 0.20 or below | — | Balance |
| 4104 | 9.0–10.5 | 0.8 or below | 0.25 or below | 0.10 or below | 1.0–2.0 | 0.20 or below | 0.02–0.20 | Balance |
| | | | | | | | | (wt %) |

As aluminum heat exchangers that have a hollow structure wherein such vacuum brazing sheets are used there are, for example, drawn-cup-type evaporators, oil coolers, and radiators are produced. For instance, a drawn-cup-type evaporator, such as shown in FIG. 3, is manufactured by stacking members (1), arranging a corrugated fin (2) between the members (1), and brazing them by heating at 600° C. in a vacuum on the order of $10^{-5}$ to $10^{-4}$ Torr. In this vacuum brazing, Mg added into the brazing material (e.g., JIS BA4004 alloy and JIS AA4104 alloy) of the brazing sheet evaporates gradually from about 400° C., and serves to remove in-oven oxidizing gases by the getter reaction of

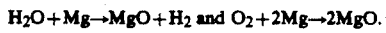

$H_2O + Mg \rightarrow MgO + H_2$ and $O_2 + 2Mg \rightarrow 2MgO$.

The Mg in the brazing material also evaporates radically when the brazing material is melted, so that the oxide film on the brazing material surface is broken, thereby making brazing possible. Si works to lower the melting point of the solder, thereby lowering the brazing temperature and making the brazing ability favorable.

On the other hand, when an oven is used for a long period of time, it is inevitable that the degree of vacuum decreases (e.g., to the order of $10^{-3}$ Torr) due, for example, to contamination of the oven. In such a case, the wettability of the solder of the brazing sheet lowers, fillet of the solder or brazing material is not formed, and the brazing ability lowers. That is, a failure phenomenon, i.e., the so-called braze-joint-defect, occurs. Therefore, development of Al—Mg—Si alloy brazing materials and brazing sheets excellent in brazing ability is desired.

Therefore, an object of the present invention is to provide an Al—Mg—Si alloy brazing material suitable as a skin material of brazing sheets in the vacuum brazing technique.

Another object of the present invention is to provide a brazing sheet to be used in the vacuum brazing technique, wherein the brazing material comprises an Al—Mg—Si alloy and stable and excellent brazing ability is exhibited without being influenced by a change in brazing conditions, such as lowering of the degree of vacuum.

Still another object of the present invention is to provide a brazing sheet excellent in vacuum brazing ability suitable for the manufacture of aluminum heat exchangers that have a hollow structure.

DISCLOSURE OF THE INVENTION

The inventors have studied in various ways to solve the problems and have found that the brazing ability and the braze-joint-defect in Al—Mg—Si alloy brazing materials relates to the size and the number of $Mg_2Si$ particles and Si particles in the metal texture of the brazing material covering the brazing sheet. Based on this finding, the inventors have studied further and have developed a brazing sheet having an Al—Mg—Si alloy brazing material excellent in vacuum brazing ability.

That is, the present invention provides a brazing sheet, one or both of the surfaces of an Al alloy core material of which are clad with a brazing material, characterized in that said brazing material contains 0.6 to 1.8 wt % of Mg, 6.0 to 20.0 wt % of Si, and the balance of Al and inevitable impurities, and the metal texture of said brazing material contains 1,000/mm² or more $Mg_2Si$ particles that are 2 to 5 μm in diameter, with the particles being assumed to be spheres, and 3,000/mm² or more Si particles that are 6 μm or less in diameter, with the particles being assumed to be spheres.

BRIEF DESCRIPTION OF THE DRAWINGS

FIGS. 1 (a) and (b) show an embodiment of a cup for heat exchangers, (a) being a plane view and (b) being a sectional view;

FIG. 2 is a sectional view of a hollow structure for a test wherein cups are stacked; and FIG. 3 is a perspective view showing an embodiment of a drawn-cup-type evaporator.

BEST MODE FOR CARRYING OUT THE INVENTION

First, the chemical composition of the brazing alloy according to the present invention will be described.

Use is made of, as the brazing material of the present invention, an Al—Mg—Si alloy comprising 0.6 to 1.8 wt % of Mg, 6.0 to 20.0 wt % of Si, and the balance of Al and inevitable impurities.

Mg in the brazing material evaporates during the brazing, to improve the degree of vacuum by the getter reaction and to break the oxide film by evaporation. If the amount of Mg is less than 0.6 wt %, the above action is not exhibited satisfactorily and the brazing ability is lowered, whereas if the amount exceeds 1.8 wt %, the Mg-type oxide film increases during the heating for brazing, thereby lowering the brazing ability.

Si in the brazing material is an additive element that lowers the melting point of the alloy, thereby making the brazing possible. If the amount of Si is less than 6.0 wt % or more than 20.0 wt %, the melting point of the solder rises and the brazing ability lowers.

The above is a first mode showing the basic composition of the present brazing alloy, but in other modes, other elements may be added in prescribed amounts in a range that will not deleteriously affect the objects of the present invention.

For example, in a second mode, 0.01 to 0.2 wt % of Bi is added to the above alloy composition. In this case, Bi improves the flowability of the solder and works to facilitate the evaporation of Mg, thereby causing the film to be more easily broken. However, if the added amount of Bi is less than 0.01 wt %, the above action is not satisfactory, whereas if the added amount is more than 0.2 wt %, the rollability of the brazing material lowers, thereby making the production of the brazing sheet difficult.

In another mode, the amount of Fe is controlled. Generally Fe is an element inevitably included in Al alloys, and in the present brazing material alloy compositions, Fe is allowed as an impurity in the rage of 0.8 wt % or less. However, if Fe is excessive, an oxide film is liable to be formed during heating for brazing, and therefore preferably the amount of Fe is 0.7 wt % or less.

Further, if the amount of Fe is 0.3 wt % or less, the Al material as raw material becomes expensive, and therefore the amount of Fe is desirably 0.3 to 0.7 wt % from an economical point of view. On one hand, if the amount of Fe in the brazing material is too large, in some cases growth of the oxide film is facilitated during heating for brazing, and on the other hand if the amount of Fe is 0.3 wt % or less, the growth of the film is made small, so that the film is readily broken when Mg evaporates, thereby improving the brazing ability particularly.

The mode containing a prescribed amount of Fe can be applied not only to the above basic composition but also to systems containing further other elements such as Bi.

A method for measuring the diameter of particles in the metal texture in the present invention will now be described.

The particles present in the brazing material were observed by a back scattered electron image using a scanning electron microscope. Of particles observed in the back scattered electron image, those that looked black were judged to be $Mg_2Si$ particles and those that looked white were judged to be Si particles, and the image analysis was effected to determine the diameters with the particles being assumed as spheres hereinafter referred to as equivalent spherical diameter.

In the present invention, the reason why the $Mg_2Si$ particles having an equivalent spherical diameter of 2 to 5 $\mu m$ are present in the metal texture in an amount of 1,000/mm$^2$ or more, is because when the equivalent spherical diameter of the particle exceeds 5 $\mu m$, the amount of evaporation of Mg in the initial stage of heating for vacuum brazing lowers and the getter reaction lowers, thereby making it impossible to obtain the expected effect. On the other hand, if the particle equivalent spherical diameter is 2 $\mu m$ or less, the force exhibited by the evaporation of Mg to break the oxide film on the brazing material surface lowers. Therefore, in the present invention there must be enough $Mg_2Si$ particles that are 2 to 5 $\mu m$ in equivalent spherical diameter. If the number of $Mg_2Si$ particles having a particle diameter in the above range is less than 1,000/mm$^2$, the ability exhibited by the evaporation of Mg to break the oxide film on the brazing material surface lowers and the getter reaction becomes unsatisfactory. Therefore the number of $Mg_2Si$ particles that are 2 to 5 $\mu m$ in equivalent spherical diameter should be restricted to 1,000/mm$^2$ or more.

The greater the number of the $Mg_2Si$ particles, the more preferable is the brazing material. And although there is no upper limit to the number of $Mg_2Si$ particles, a number of about 20,000/mm$^2$ is a production limit.

In the present invention, the reason the Si particles in the brazing material are 6 $\mu m$ or less in equivalent spherical diameter are contained in an amount of 3,000/mm$^2$ or more in number is because when the equivalent spherical diameter of the Si particles exceeds 6 $\mu m$, it requires a longer period of time until the solder is melted. As a result the time required for the brazing must be extended or the brazing temperature must be elevated. Therefore, in the present invention the Si particles are to be 6 $\mu m$ or less in equivalent spherical diameter. Where Si particles are 0.5 $\mu m$ or more in equivalent spherical diameter, they can be recognized by an image analyzing apparatus, and counting of the Si particles is possible in that range. When the number of Si particles whose size is in that range is less than 3,000/mm$^2$, the desired effect of the above reaction cannot be obtained. Therefore, by restricting the number of Si particles that are 6 $\mu m$ or less in equivalent spherical diameter to be more than 3,000/mm$^2$, the brazing ability is further improved. It is acceptable if the number of Si particles exceeds 3,000/mm$^2$, and although there is no particular upper limit to the number, a number of about 30,000/mm$^2$ is a production limit.

In the present invention, by restricting the number of $Mg_2Si$ particles that are 2 to 5 $\mu m$ in equivalent spherical diameter present in the metal texture in the brazing material to 1,000/mm$^2$ or more, the oxide film on the brazing material surface is caused to be well broken by the evaporation of Mg, and the getter reaction improves the discharge of oxidizing gases. Further, by restricting the number of Si particles that are 6 $\mu m$ or less in equivalent spherical diameter to 3,000/mm$^2$ or over, the brazing time can be shortened and the brazing temperature can be made rather lower, so that the brazing ability can be made better.

The present brazing material can be used as a skin material to cover one or both of the surfaces of an Al alloy core material to produce a brazing sheet. There is no particular restriction on the aluminum material as the core material. Usual core materials can be used. To produce the clad metal of a core material and a skin material, the conventional method can be used and the ratio of the thickness of the core material to that of the skin material can be set in accordance with the usual way with no particular difference from conventional ones.

In the present invention, to obtain a desired distribution of $Mg_2Si$ particles and a desired distribution of Si particles, conditions of casting and soaking of the brazing material, heating of the brazing material to be clad with the core material, hot rolling, intermediate annealing, etc. are properly controlled.

EXAMPLES

Now the present invention will be described in more detail based on examples.

EXAMPLE 1

As an Al alloy core material and a brazing material, materials made up of components shown in Table 2 were used (brazing materials A and B are brazing materials according to the present invention), and in the steps of producing brazing sheets that have a thickness of 0.6 mm and whose both surfaces are clad (the cladding ratio on one surface is 15%), the soaking treatment conditions of the brazing material, the conditions of heating for cladding, and the annealing conditions were changed to vary the state of the $Mg_2Si$ particles and Si particles present in the brazing material, and brazing sheets (which were annealed materials having a thickness of 0.6 mm) shown in Table 3 were produced.

The specific method for producing brazing sheet Nos. 1 to 10 in Table 3 were as follows.

Casting of the brazing material (skin material)→soaking (520° C. for 3 hours)→heating for cladding the Al core material with the skin material (520° C. for 3 hours)→hot rolling→cold rolling→finishing annealing (330° C. for 3 hours)→an annealed material having a thickness of 0.6 mm.

The specific method for producing brazing sheet Nos. 11 and 12 (conventional examples) in Table 3 were as follows.

Casting of the brazing material (skin material)→soaking (485° C. for 3 hours)→heating for cladding the Al core material with the skin material (485° C. for 3 hours)→hot rolling→intermediate annealing (360° C. for 2 hours)→cold rolling→finishing rolling (360° C. for 2 hours)→an annealed material having a thickness of 0.6 mm.

The thus produced brazing sheet was press molded into a cup (3) shown in FIGS. 1 (a) (a plan view) and (b) (a sectional view). In the figures, (4) indicates an exhaust port. The cups formed by press molding the brazing sheets were stacked and were formed into a hollow structure (5) for a test shown in FIG. 2 by vacuum brazing and the hollow structure (5) was tested. In the figure, (3) indicates a cup with an exhaust port, (6) indicates a cup without any exhaust port, and (7) indicates an exhaust cylinder.

The test conditions of the brazing were such that the brazing was done under a vacuum of $5 \times 10^{-5}$ Torr, the temperature rise rate was 30° C./min until the temperature had reached 600° C., and this temperature was kept for 10 min. The evaluation was based on the state of the formation of fillet at the clad surfaces after the brazing and the braze-joint-defect-occurrence ratio was found by testing 100 pieces. The results are shown in Table 3.

TABLE 2

|  | Si | Fe | Cu | Mn | Mg | Zn | Zr | Bi | Ti | B | Al |
| --- | --- | --- | --- | --- | --- | --- | --- | --- | --- | --- | --- |
| Core material | 0.16 | 0.44 | 0.10 | 0.10 | — | 0.10 | 0.11 | — | 0.01 | 0.003 | Balance |
| Brazing material A | 11.5 | 0.43 | 0.12 | — | 1.25 | — | — | 0.09 | — | — | Balance |
| Brazing material B | 12.3 | 0.68 | 0.09 | — | 1.21 | — | — | — | — | — | Balance (wt %) |

TABLE 3

| No. | Remarks | Brazing material | Number of $Mg_2Si$ particles (Number/mm$^2$) ~2 μm | 2~5 μm | 5 μm ~ | Number of Si particles (Number/mm$^2$) 6 μm or below | Ratio of braze-joint-defect-occurrence |
| --- | --- | --- | --- | --- | --- | --- | --- |
| 1 | This invention | A | 2234 | 4326 | 1587 | 12515 | 5 |
| 2 | This invention | A | 3621 | 3363 | 1165 | 13728 | 7 |
| 3 | This invention | A | 1968 | 6982 | 2031 | 11034 | 4 |
| 4 | This invention | B | 3625 | 3892 | 2001 | 10724 | 8 |
| 5 | Comparative example | A | 927 | 856 | 3279 | 8954 | 33 |
| 6 | Comparative example | A | 2549 | 3465 | 3056 | 2287 | 25 |
| 7 | Comparative example | A | 1758 | 928 | 4145 | 2788 | 31 |
| 8 | Comparative example | B | 944 | 905 | 4006 | 7243 | 29 |
| 9 | Comparative example | B | 2295 | 4032 | 2873 | 2363 | 26 |
| 10 | Comparative example | B | 1112 | 931 | 3873 | 2854 | 34 |
| 11 | Conventional example | A | 8256 | 946 | 798 | 10528 | 27 |
| 12 | Conventional example | B | 9037 | 972 | 825 | 11234 | 30 |

From Table 3, it can be understood that the present brazing sheets are remarkably improved in the capability of forming fillet and are stable in brazing ability in comparison with the results of conventional examples and comparative examples.

EXAMPLE 2

This example is a case wherein the iron content of a brazing material is 0.3 wt % or less.

As an Al alloy core material and brazing materials, alloys made up of components shown in Table 4 were used, and in the steps of producing brazing sheets that have a thickness of 0.6 mm and whose both surfaces are clad (the cladding ratio on one surface is 15%), the soaking treatment conditions of the brazing material, the conditions of heating for cladding, and the annealing conditions were changed to vary the state of the $Mg_2Si$ particles and Si particles present in the brazing material, and brazing sheet Nos. 1 to 8 (which were annealed materials having a thickness of 0.6 mm) shown in Table 5 were produced. The producing method of Nos. 1 to 4 in Table 5 was the same as that of Nos. 1 to 10 in Example 1, and the producing method of Nos. 5 to 8 in Table 5 was the same as that of Nos. 11 and 12 in Example 1.

The brazing sheets were used to make cups similar to those in Example 1 and the test of brazing ability was performed in a similar manner to Example 1. The results are shown in Table 5.

TABLE 4

|  | Si | Fe | Cu | Mn | Mg | Zn | Bi | Ti | B | Al |
|---|---|---|---|---|---|---|---|---|---|---|
| Core material | 0.16 | 0.44 | 0.10 | 0.10 | — | 0.10 | — | 0.01 | 0.003 | Balance |
| Brazing material A | 12.1 | 0.21 | 0.11 | — | 1.23 | — | 0.11 | — | — | Balance |
| Brazing material B | 11.3 | 0.24 | 0.10 | — | 1.30 | — | — | — | — | Balance (wt %) |

TABLE 5

| No. | Remarks | Brazing material | Number of $Mg_2Si$ particles (Number/mm$^2$) | | | Number of Si particles (Number/mm$^2$) | Ratio of braze-joint-defect- |
|---|---|---|---|---|---|---|---|
|  |  |  | ~2 μm | 2~5 μm | 5 μm ~ | 6 μm or below | occurrence |
| 1 | This invention | A | 3726 | 3243 | 1991 | 10532 | 0 |
| 2 | This invention | A | 3021 | 4094 | 3482 | 8179 | 0 |
| 3 | This invention | B | 4205 | 3478 | 2174 | 10918 | 2 |
| 4 | This invention | B | 3574 | 3998 | 3242 | 9954 | 1 |
| 5 | Comparative example | A | 2217 | 4427 | 3622 | 2495 | 21 |
| 6 | Comparative example | A | 2890 | 944 | 3327 | 2674 | 19 |
| 7 | Comparative example | B | 10045 | 929 | 893 | 11827 | 23 |
| 8 | Comparative example | B | 3028 | 953 | 3048 | 2678 | 23 |

From Table 5, it can be understood that the present brazing sheets are improved remarkably in the capability of forming fillet and are stable in brazing ability.

INDUSTRIAL APPLICABILITY

Thus, according to the present invention, the brazing ability of a brazing material of an Al—Mg—Si alloy can be improved, so that the rejection rate can be remarkably reduced, which results in an industrially remarkable effect that makes, for example, stable operation possible.

What we claim is:

1. A brazing sheet, comprising an Al alloy core material having one or both of the surfaces of said core material clad with a brazing material, said brazing material containing 0.6 to 1.8 wt % of Mg, 6.0 to 20.0 wt % of Si, and the balance being Al and inevitable impurities; wherein the metal texture of said brazing material contains at least 1,000/mm$^2$ $Mg_2Si$ particles that have an equivalent spherical diameter of 2 to 5 μm and at least 3,000/mm$^2$ Si particles that have an equivalent spherical diameter of 6 μm or less.

2. The brazing sheet as claimed in claim 1, wherein said brazing material contains up to 0.8 wt % of Fe.

3. The brazing sheet as claimed in claim 1, wherein said brazing material contains up to 0.3 wt % of Fe.

4. A brazing sheet, comprising an Al alloy core material having one or both of the surfaces of said core material clad with a brazing material, said brazing material containing 0.6 to 1.8 wt % of Mg, 6.0 to 20.0 wt % of Si, 0.01 to 0.2 wt % of Bi, and the balance being Al and inevitable impurities; wherein the metal texture of said brazing material contains at least 1,000/mm$^2$ $Mg_2Si$ particles that have an equivalent spherical diameter of 2 to 5 μm and at least 3,000/mm$^2$ Si particles that have an equivalent spherical diameter of 6 μm or less.

5. The brazing sheet as claimed in claim 4, wherein said brazing material contains up to 0.8 wt % of Fe.

6. The brazing sheet as claimed in claim 4, wherein said brazing material contains up to 0.3 wt % of Fe.

* * * * *